United States Patent
Kishida et al.

(10) Patent No.: US 8,164,511 B2
(45) Date of Patent: Apr. 24, 2012

(54) SIGNAL PROCESSING DEVICE, RADAR DEVICE, VEHICLE CONTROL DEVICE, AND SIGNAL PROCESSING METHOD

(75) Inventors: Masayuki Kishida, Kobe (JP); Hisateru Asanuma, Kobe (JP); Kohsuke Noda, Kobe (JP); Tomoya Kawasaki, Toyota (JP)

(73) Assignee: Fujitsu Ten Limited, Kobe (JP)

( * ) Notice: Subject to any disclaimer, the term of this patent is extended or adjusted under 35 U.S.C. 154(b) by 372 days.

(21) Appl. No.: 12/461,198

(22) Filed: Aug. 4, 2009

(65) Prior Publication Data

US 2010/0033364 A1     Feb. 11, 2010

(30) Foreign Application Priority Data

Aug. 5, 2008   (JP) ................................ 2008-201380

(51) Int. Cl.
*G01S 13/58* (2006.01)
*G01S 13/93* (2006.01)

(52) U.S. Cl. .......... 342/112; 342/70; 342/103; 342/129; 342/130; 342/200

(58) Field of Classification Search ............. 342/112
See application file for complete search history.

(56) References Cited

U.S. PATENT DOCUMENTS

| | | | | |
|---|---|---|---|---|
| 5,345,470 A * | 9/1994 | Alexander | | 375/144 |
| 5,625,362 A * | 4/1997 | Richardson | | 342/70 |
| 5,633,642 A * | 5/1997 | Hoss et al. | | 342/70 |
| 6,396,436 B1 * | 5/2002 | Lissel et al. | | 342/70 |
| 6,469,656 B1 * | 10/2002 | Wagner et al. | | 342/70 |
| 6,492,938 B1 * | 12/2002 | Alland | | 342/129 |
| 6,633,815 B1 * | 10/2003 | Winter et al. | | 701/301 |
| 6,825,797 B2 * | 11/2004 | Ishii et al. | | 342/70 |
| 7,385,550 B2 * | 6/2008 | Winter et al. | | 342/70 |
| 7,714,771 B2 * | 5/2010 | Lehre et al. | | 342/109 |
| 7,786,926 B2 * | 8/2010 | Hilsebecher et al. | | 342/72 |
| 2009/0121915 A1 * | 5/2009 | Randler et al. | | 342/70 |
| 2011/0181456 A1 * | 7/2011 | Luebbert et al. | | 342/70 |

FOREIGN PATENT DOCUMENTS

| | | |
|---|---|---|
| JP | B2-2794611 | 9/1998 |
| JP | A-2004-151022 | 5/2004 |
| WO | WO 2007147533 A1 * | 12/2007 |

\* cited by examiner

*Primary Examiner* — Thomas Tarcza
*Assistant Examiner* — Matthew M Barker
(74) *Attorney, Agent, or Firm* — Oliff & Berridge, PLC

(57) ABSTRACT

In order to prevent delays in output of detection results, even when a plurality of frequency modulation methods with different frequency change rates are used, an FM-CW radar device employing frequency modulation with two different frequency change rates, has distance/velocity detection unit for detecting the relative distance or relative velocity of a target object based on beat signals of transmission signals with the same frequency change rate and for detecting the relative distance or relative velocity using beat signals when the frequency change rates are different, and distance/velocity confirmation unit for adding evaluation values for relative distances or relative velocities detected in the detection processing, and for confirming the relative distance or relative velocity based on the evaluation value which has reached a criterion value. As a result, more data can be obtained in one detection cycle, and the same advantageous results as when executing a plurality of detection cycles can be obtained. Consequently, delay of output of detection results from the radar device to a vehicle control device can be prevented.

16 Claims, 15 Drawing Sheets

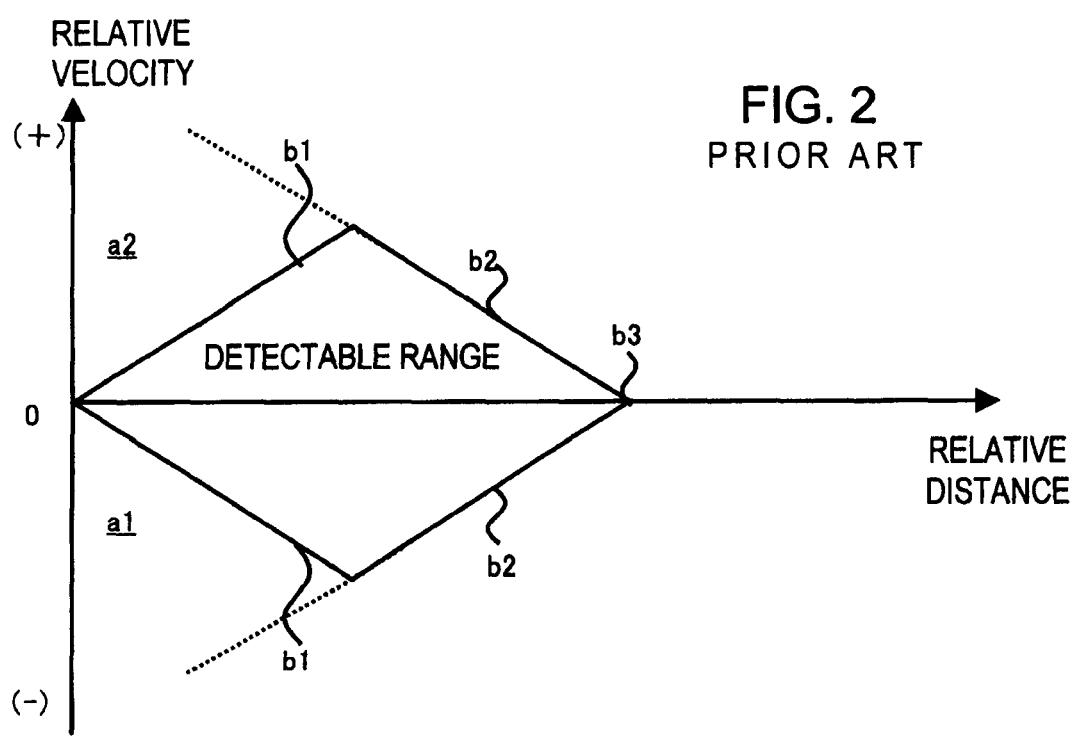

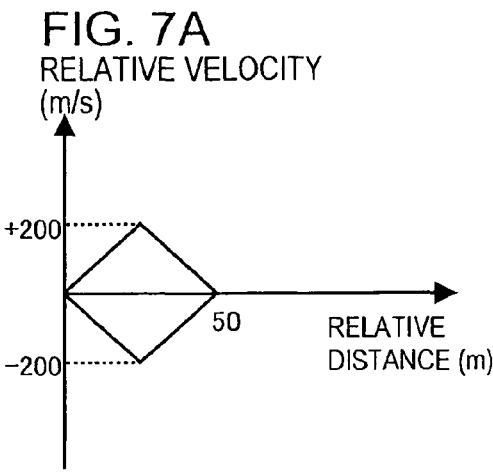
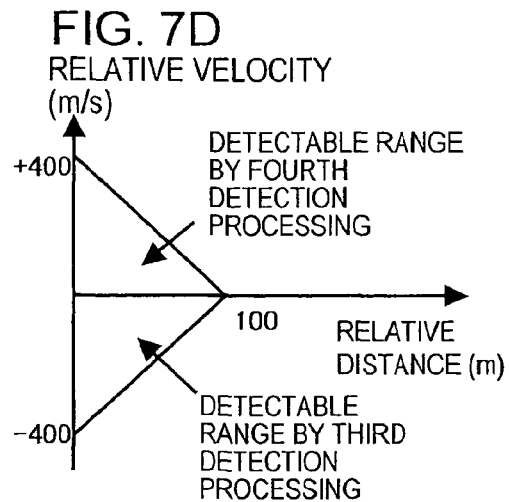
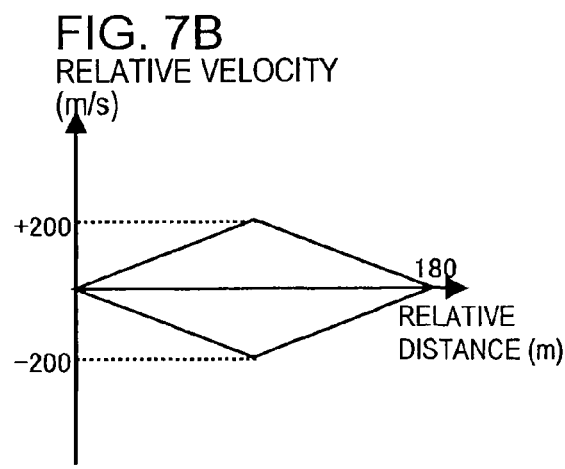
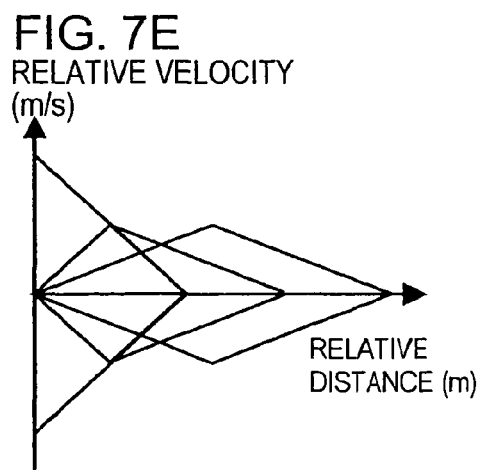
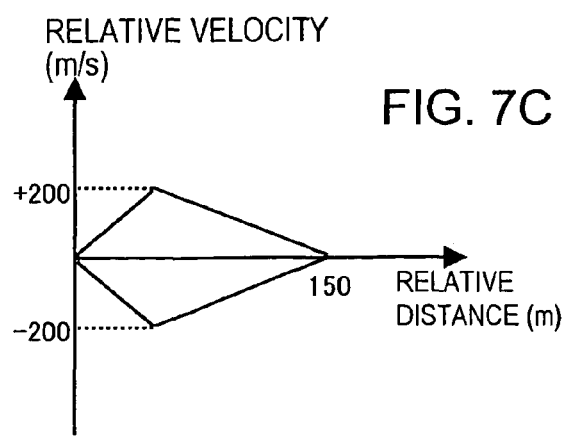

|  | EVALUATION VALUE |
|---|---|
| P1 | 1 |
| P2 | 1 |
| P3 | 1 |
| P4 | 1 |
| P5 | 2 |
| P6 | 3 |
| P7 | 3 |
| P8 | 4 |
| P9 | 4 |

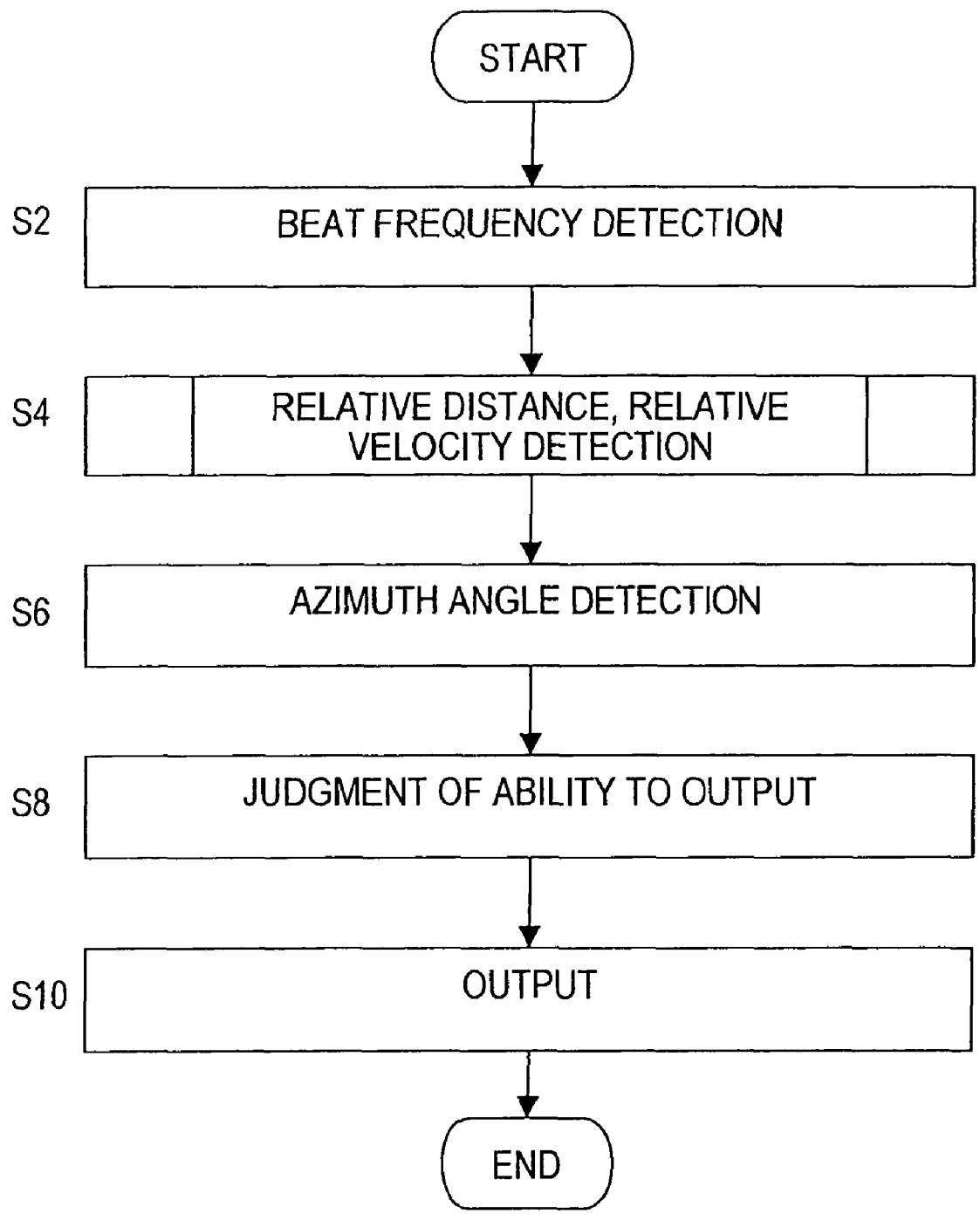

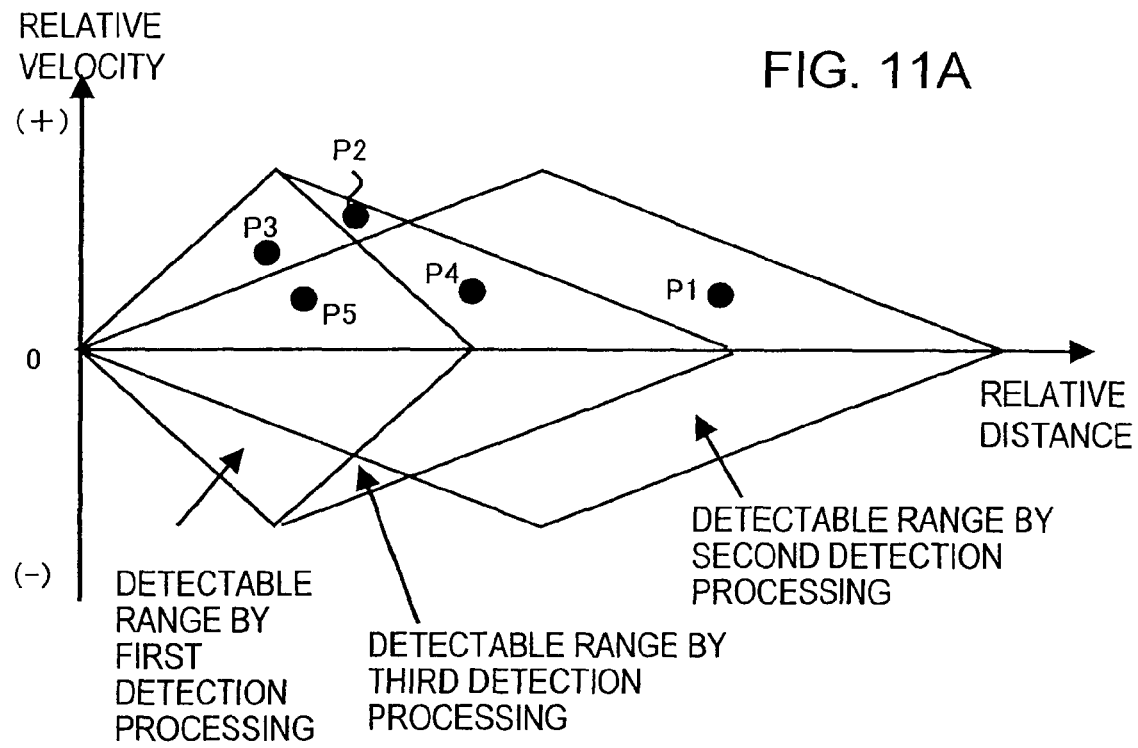

|  | EVALUATION VALUE |
|---|---|
| FORTH DETECTION PROCESSING | 4 |
| FIFTH DETECTION PROCESSING | 3 |
| SECOND DETECTION PROCESSING | 1 |

|  | EVALUATION VALUE |
|---|---|
| P1 | 1 |
| P2 | 4 |
| P3 | 3 |
| P4 | 5 |
| P5 | 4 |

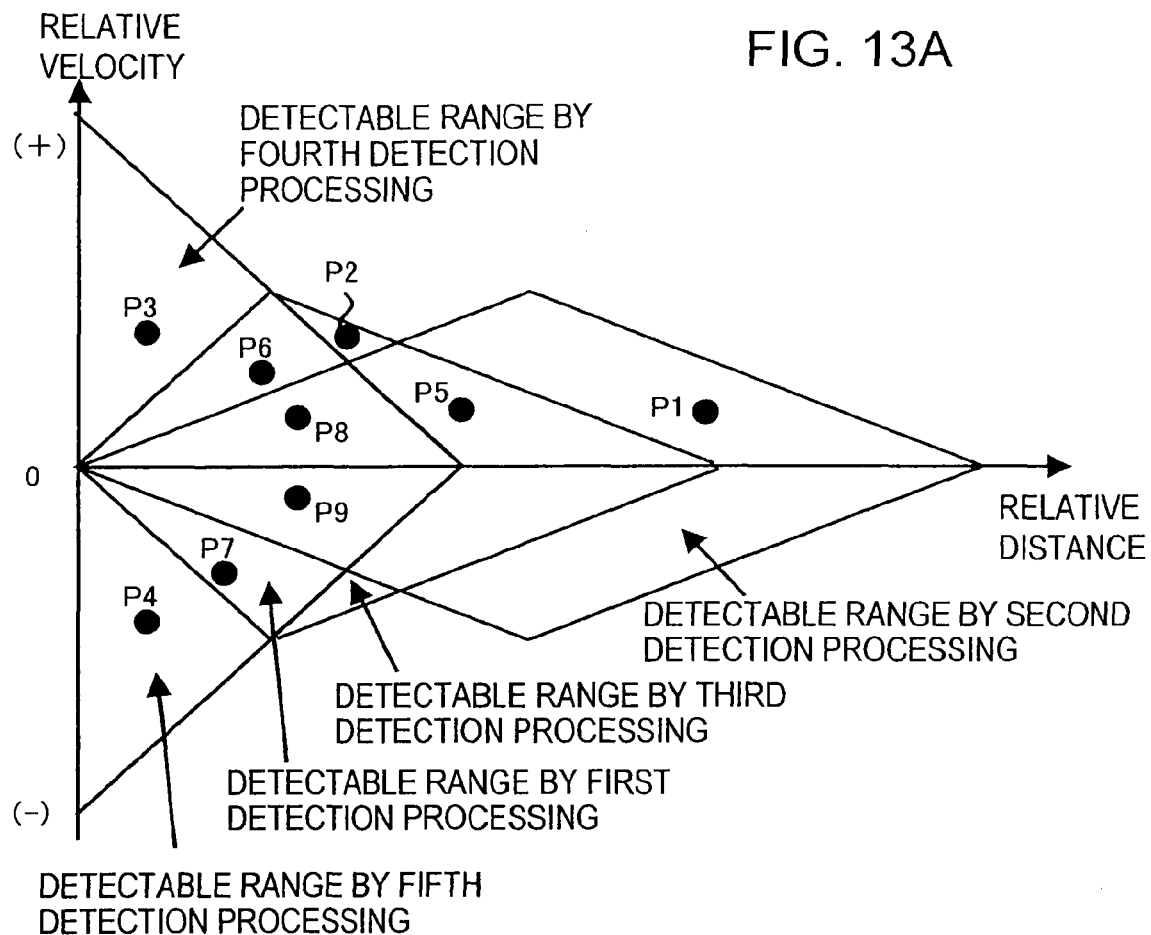

FIG. 13B

| | EVALUATION VALUE |
|---|---|
| FIRST DETECTION PROCESSING | 5 |
| SECOND DETECTION PROCESSING | 1 |
| THIRD DETECTION PROCESSING | 3 |
| FORTH DETECTION PROCESSING | 4 |
| FIFTH DETECTION PROCESSING | 3 |

FIG. 13C

| | EVALUATION VALUE |
|---|---|
| P1 | 1 |
| P2 | 2 |
| P3 | 3 |
| P4 | 4 |
| P5 | 3 |
| P6 | 10 |
| P7 | 11 |
| P8 | 12 |
| P9 | 13 |

SIGNAL PROCESSING DEVICE, RADAR DEVICE, VEHICLE CONTROL DEVICE, AND SIGNAL PROCESSING METHOD

CROSS-REFERENCE TO RELATED APPLICATIONS

This application is based upon and claims the benefit of priority of the prior Japanese Patent Application No. 2008-201380, filed on Aug. 5, 2008, the entire contents of which are incorporated herein by reference.

BACKGROUND OF THE INVENTION

1. Field of the Invention

This invention relates to a signal processing device and similar of a radar transceiver which receives reflected signals of transmission signals subjected to frequency modulation such that the frequency rises and falls and which generates beat signals having the frequency corresponding to the frequency difference between the transmission signals and reception signals, and in particular relates to a signal processing device and similar which uses beat signals generated when the frequency change rates of transmission signals are different to detect the relative distance or relative velocity of a target object.

2. Description of the Related Art

In recent years, vehicles have been equipped with radar devices employing FM-CW (Frequency Modulated-Continuous Wave) designs, as obstruction detection means in the vehicle. FM-CW radar devices transmit and receive radar signals subjected to frequency modulation such that the frequency rises and falls, and detect the relative distances and relative velocities of target objects.

FIG. 1A to FIG. 1D explain the principle of detection of the relative distance and relative velocity by an FM-CW radar device. In FIG. 1A to FIG. 1D, the horizontal axis indicates time and the vertical axis indicates frequency. FIG. 1A shows the frequency changes in the reception signals and in the transmission signals transmitted by the FM-CW radar device. The frequency of transmission signals rises and falls linearly (ramps up and down), with a central frequency f0 and frequency modulation width $\Delta F$, according to the frequency modulation signal with a sawtooth waveform and frequency fm, as indicated by the solid line. On the other hand, reception signals which are reflected by the target object and return have a temporal delay of $\Delta T$ due to the relative distance, and a frequency shift by a Doppler shift amount $\gamma$ according to the relative velocity, as indicated by the dashed line. As a result, in the transmitted and received signals there occur a frequency difference $\alpha$ in the transmission signal's frequency ramp up interval (up interval), and a frequency difference $\beta$ in the frequency ramp down interval (down interval). By mixing transmitted and received signals, the radar device generates beat signals having frequencies corresponding to the frequency differences between the transmitted and received signals, and the beat signal frequencies (beat frequencies) are analyzed to detect the frequency differences. Then, the following equations are used to detect the relative distance R and relative velocity V of the target object. Here C is the speed of light.

$$R = C \cdot (\alpha + \beta)/(8 \cdot \Delta F \cdot fm)$$

$$V = C \cdot (\beta - \alpha)/(4 \cdot f0)$$

Here, when the positive or negative relative velocity of the target object increases in the state of FIG. 1A, the Doppler frequency shift widths of the reception signals increase, and frequency differences between the transmission and reception signal decrease in the up and in the down intervals. And as shown in FIG. 1B, when the frequency shift is $\gamma 1$ or $\gamma 2$, beat frequency detection is no longer possible. When in the state of FIG. 1A the relative distance of the target object increases, the time delay in the reception signal ($\Delta T1$) increases as shown in FIG. 1C, and as a result the beat frequency becomes as large as $\alpha 1$ and $\beta 1$, and in particular the beat frequency $\beta 1$ in down intervals, becomes large. And, when the beat frequency exceeds the Nyquist frequency of the reference clock in the signal processing device, beat frequency detection is no longer possible. When the relative distance increases further, the delay time $\Delta T2$ exceeds ½ the wavelength of the sawtooth wave as shown in FIG. 1D, the transmission and reception signals no longer overlap in the up intervals or down intervals, and beat frequency detection is no longer possible. Thus due to the principle of the FM-CW method, there are limits to the relative distances and relative velocities which can be detected.

FIG. 2 shows the range of relative distances and relative velocities which can be detected in the above method. The horizontal axis indicates relative distance and the vertical axis indicates relative velocity. The boundary lines b1, b2 correspond to the states indicated in FIG. 1B and FIG. 1C respectively; the boundary point b3 corresponds to the state indicated in FIG. 1D. Hence within the range in which detection is possible (detectable range), bounded by the boundary lines b1, b2 and the boundary point b3, the relative distance and relative velocity are detected.

A radar device for vehicles is required to detect rapidly approaching target objects (objects with a large negative relative velocity) at short distances, due to the need for collision avoidance control and collision response control. That is, it is required that the relative distance and relative velocity for a target object be detected in a region a1 outside the detectable range in FIG. 2. Or, due to the need to control following travel in congested traffic, it is required that a target object be detected which is rapidly moving away (large positive relative velocity) at a short distance. That is, it is required that the relative distance and relative velocity of a target object be detected in the region a2, outside the detectable range in FIG. 2.

To address these requirements, a method has been proposed in which transmission signals are subjected to frequency modulation with a large frequency change rate and frequency modulation with a small frequency change rate, and by combining the beat signals obtained from both these cases, the relative distance and relative velocity are detected; one example is described in Japanese Patent Application Laid-open No. 2004-151022.

In this method, as shown in FIG. 3A, a transmission interval T1, in which transmission signals are transmitted having a large transmission signal frequency change rate (that is, a large absolute value of the rate of change of the frequency, represented by the inclination of the sawtooth wave), and a transmission interval T2, in which transmission signals are transmitted having a small transmission signal frequency change rate (that is, a small absolute value of the rate of change of the frequency, represented by the inclination of the sawtooth wave), are provided. The beat frequencies of beat signals generated in the up intervals of each of these transmission intervals, or the beat frequencies of the beat signals generated in the down intervals, are combined, and the following equations (1) through (4) are used to calculate the relative distance R and relative velocity V.

[When combining beat frequencies in up intervals]

$$R = (2 \cdot \alpha 2 - \alpha 1)/(2 \cdot 4 \cdot \Delta F2 \cdot fm2/C) \qquad (1)$$

$$V = \{\Delta F1 \cdot fm1 \cdot \alpha 2/(\Delta F2 \cdot fm2 - \Delta F1 \cdot fm1) - \alpha 1\}/(4 \cdot f0/C) \qquad (2)$$

[When combining beat frequencies in down intervals]

$$R = (2 \cdot \beta 2 - \beta 1)/(2 \cdot 4 \cdot \Delta F2 \cdot fm2/C) \qquad (3)$$

$$V = \{\Delta F1 \cdot fm1 \cdot \beta 2/(\Delta F2 \cdot fm2 - \Delta F1 \cdot fm1) - \beta 1\}/(4 \cdot f0/C) \qquad (4)$$

In equations (1) through (4), for the transmission interval T1 the transmission signal frequency change width is $\Delta F1$, the up interval beat frequency is $\alpha 1$, the down interval beat frequency is $\beta 1$, and the sawtooth wave frequency is fm1; for the transmission interval T2 the transmission signal frequency change width is $\Delta F2$, the up interval beat frequency is $\alpha 2$, the down interval beat frequency is $\beta 2$, and the sawtooth wave frequency is fm2. The central frequency of the transmission signals for both intervals is f0, and the speed of light is C.

The range in which the relative distance and relative velocity can be detected using this method is shown in FIG. 3B. That is, the relative distance and relative velocity are detected in the region a2 in which detection is possible using the equations (1) and (2). And, the relative distance and relative velocity are detected in the region a1 in which detection is possible using the equations (3) and (4).

However, in a radar device for vehicles, when the relative distance and relative velocity are detected within a constant error range over a certain number of consecutive detection cycles, the detection results are regarded as having continuity and are output to a control device of the vehicle. By this means, the accuracy of the detection results is guaranteed.

In the above-described method, the transmission interval T1 in which the frequency change rate is large and the transmission interval T2 in which the frequency change rate is small are processed as a single detection cycle. Hence when for example the number of detection cycles taken to be required for a judgment of continuity is three, in order to obtain a detection result which can be output, the time to execute both the transmission intervals T1 and T2 three times is required. In other words, by using two types of frequency modulation, the detection cycle is lengthened, and to this extent the detection result output is delayed. As a result, there is the problem that the timing of vehicle control is delayed.

SUMMARY OF THE INVENTION

Hence an object of this invention is to provide a signal processing device and similar which prevents delay of output of the detection result, even when a plurality of different frequency change rates are used.

In order to attain the above object, in a first mode of the invention, a signal processing device, of a radar transceiver which receives reflected signals of transmitted signals subjected to frequency modulation such that the frequency rises and falls, and which generates beat signals having frequencies corresponding to the frequency differences between the transmission signals and reception signals, has distance/velocity detection unit and distance/velocity confirmation unit. The distance/velocity detection unit, in each detection cycle comprising a plurality of transmission intervals with different frequency change rates of the transmission signals, detects a relative distance or relative velocity of a target object based on beat signals generated in any of the transmission intervals, and detects the relative distance or relative velocity of the target object based on a combination of the beat signals generated in different transmission intervals. And the distance/velocity confirmation unit sets an evaluation value for the detected relative distance or relative velocity, and confirms the relative distance or relative velocity based on the evaluation value.

In this mode, the distance/velocity detection unit, in each detection cycle, detects the relative distance or relative velocity of a target object based on beat signals generated in any of the transmission intervals, and detects the relative distance or relative velocity of the target object based on a combination of beat signals generated in different transmission intervals, so that different detection process can be performed to detect the same relative distance and relative velocity in a single detection cycle. And, the distance/velocity confirmation unit sets an evaluation value for the detected relative distance or relative velocity, and when the total sum of evaluation values has reached a criterion value, confirms the relative distance or relative velocity, so that continuity judgment can be performed in a small number of detection cycles in the same way as in execution of a plurality of detection cycles. Hence delay in output of detection results from the radar device to a vehicle control device can be prevented.

BRIEF DESCRIPTION OF THE DRAWINGS

FIG. 2 shows the range of relative distances and relative velocities that can be detected in the FM-CW method;

FIG. 7A to FIG. 7E show the range of relative distances and relative velocities which can be detected by detection processing;

FIG. 9 is a flowchart showing the procedure of operation of the signal processing device in an aspect;

FIG. 11A to FIG. 11C show an example of evaluation values based on a first method;

FIG. 13A to FIG. 13C show an example of evaluation values in a case which combines the first and second methods;

DESCRIPTION OF THE PREFERRED EMBODIMENTS

Figure 1A:
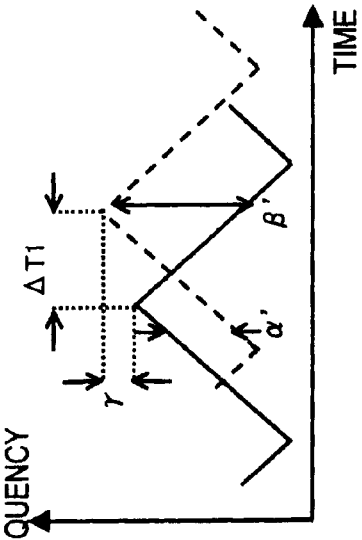
FIG. 1A to FIG. 1D explain the principle of detection of relative distance and relative velocity by an FM-CW radar device.
Figure 1C:
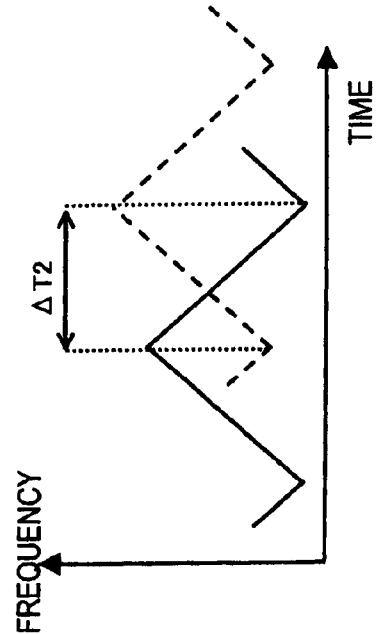

Below, an aspect of the invention is explained referring to the drawings. However, the technical scope of the invention is not limited to this aspect, but extends to the inventions described in the Scope of Claims, and to inventions equivalent thereto.

Figure 4:
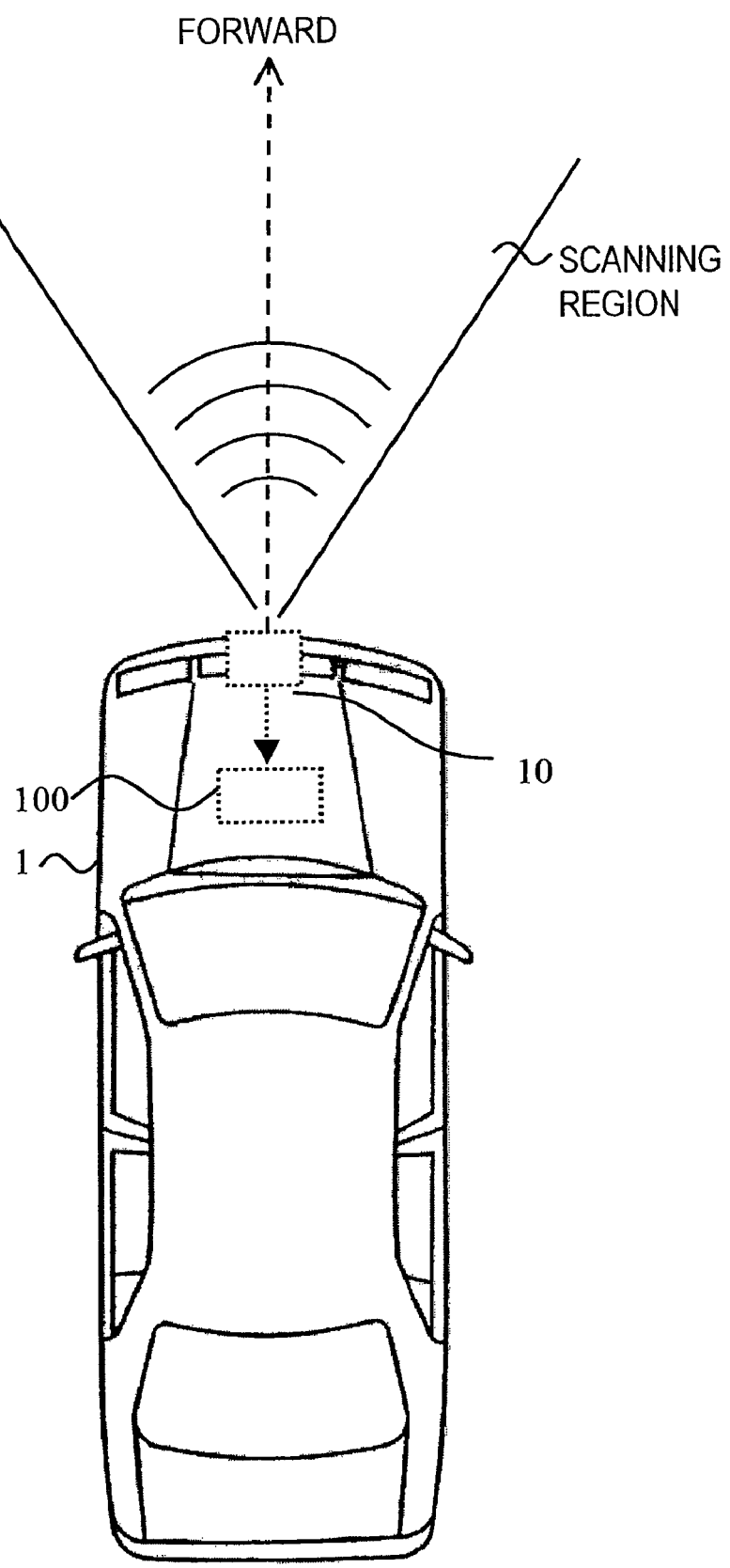
FIG. 4 explains the circumstances of use of a radar device to which this invention is applied.

FIG. 4 explains the circumstances of use of a radar device to which this invention is applied. As one example, an FM-CW radar device 10 is installed in the front grill or within the bumper in the front portion of a vehicle 1, and transmits millimeter-wave radar signals (electromagnetic waves) in a scanned region in the forward direction of the vehicle 1, passing through a radome formed in the front face of the front grill or bumper, as well as receiving signals reflected from the scanned region.

The radar device 10 generates beat signals from the transmitted and received signals, and by processing these beat signals using a microcomputer or other signal processing device, the relative distance and relative velocity of a target object within the scanned region are detected. The target object is for example a vehicle leading the vehicle 1, an oncoming vehicle, another vehicle approaching head-on, and similar. Based on the detection results, the vehicle control device 100 controls various actuators in the vehicle 1 so as to travel following the leading vehicle, avoid a collision with another vehicle, protect passengers in the vehicle, or similar.

The circumstances of use shown in the figure are one example; uses in which a radar device 10 is installed in a side face of the vehicle 1 to monitor the side direction of the vehicle 1, or in which a radar device 10 is installed in the rear portion of the vehicle 1 to monitor the rear direction of the vehicle 1, are also possible. Or, a radar device 10 can be installed in a front-side portion of the vehicle 1 to monitor a front-side direction of the vehicle 1, or can be installed in a rear-side portion of the vehicle 1 to monitor a rear-side direction of the vehicle 1.

Figure 5:
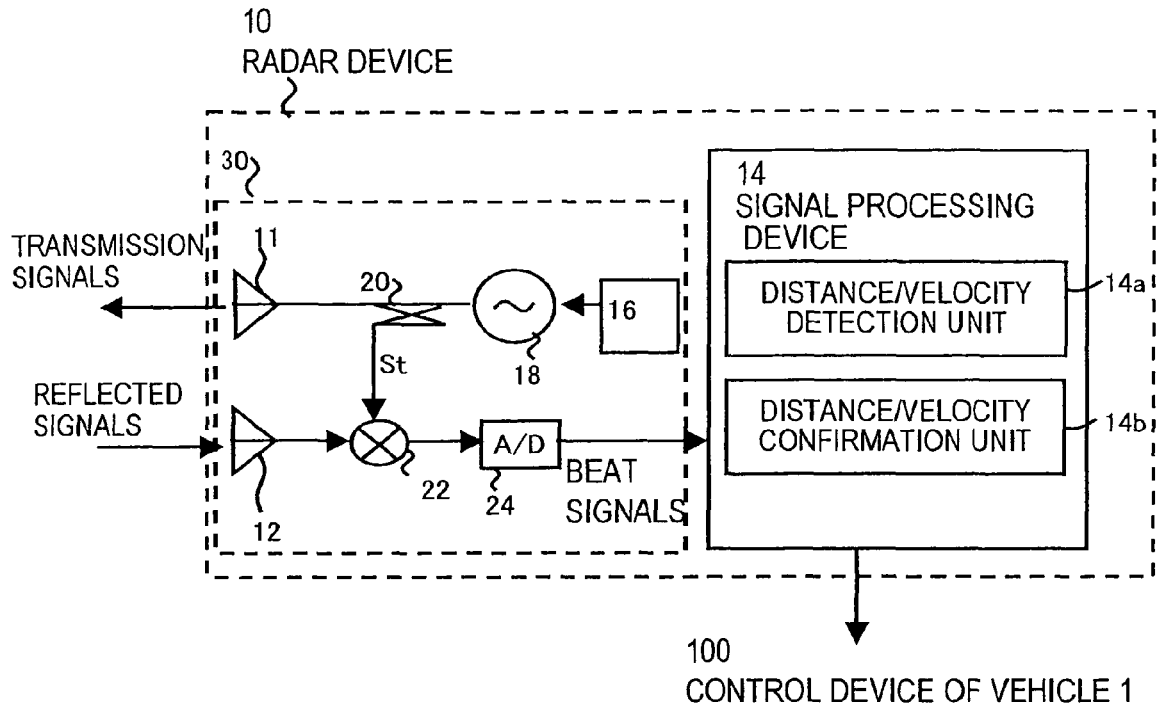
FIG. 5 explains the configuration of the radar device of an aspect.

FIG. 5 explains the configuration of the radar device of this aspect. The radar device 10 comprises a radar transceiver 30, which transmits transmission signals subjected to FM-CW frequency modulation, receives the reflected signals, and generates beat signals having frequencies corresponding to frequency differences of the transmitted and received signal, and a signal processing device 14 which processes the beat signals generated by the radar transceiver 30. In the radar transceiver 30, a frequency modulation instruction portion 16 generates a sawtooth-wave frequency modulation signal, and a voltage controlled oscillator (VCO) 18 outputs a transmission signal the frequency of which rises linearly in the rising segments of the sawtooth waveform and falls linearly in the falling segments of the sawtooth waveform, according to the signal generated by the frequency modulation instruction portion 16. This transmission signal is power-distributed by a distributor 20, and a portion is sent to a transmission antenna 11. Reflected signals are received by a reception antenna 12, and the reception signals are input to a mixer 22. The mixer 22 mixes a portion of the power-distributed transmission signals with the reception signals, and generates beat signals having frequencies corresponding to the frequency differences between the two signals. The beat signals are converted by an AD converter into digital data, which is output to the signal processing device 14.

The signal processing device 14 has a DSP (Digital Signal Processor) or other computation device which executes FFT (Fast Fourier Transform) processing of the beat signals converted into digital data, and a microcomputer which processes the beat signal frequency spectra and calculates the position and similar of the target object. This microcomputer has a CPU (Central Processing Unit), ROM (Read Only Memory) which stores various processing programs and control programs executed by the CPU, and RAM (Random Access Memory) in which the CPU temporarily stores various data.

Hence distance/velocity detection unit 14a which uses beat signal frequencies to detect the target object relative distance and relative velocity, and distance/velocity confirmation unit 14b which confirms the detected relative distance and relative velocity, are configured using programs which specify various processing procedures and a CPU which executes these.

Operation of a radar device 10 configured as described above is explained.

Figure 6:
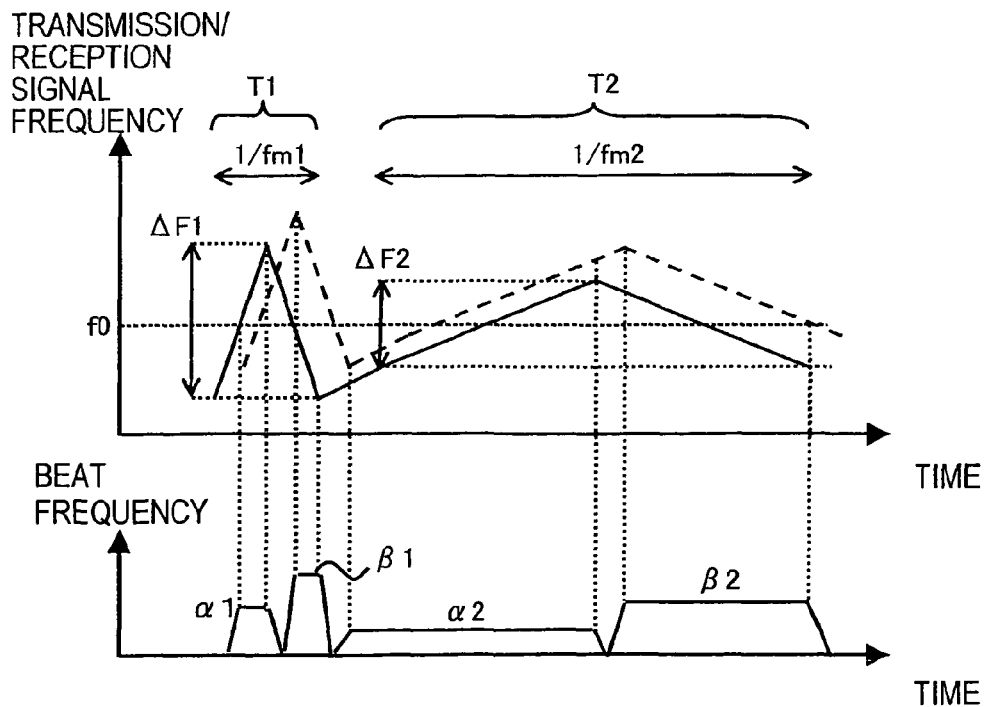
FIG. 6 shows frequency changes in the transmission signals of the radar transceiver 30 and frequency changes in beat signals.

FIG. 6 shows the frequency change of transmission signals of the radar transceiver 30, and the frequency change of beat signals. First, as shown at the top of FIG. 6, the radar transceiver 30 repeats a transmission interval T1 in which transmission signals with a large frequency change rate (indicated by a solid line) are transmitted, and a transmission interval T2 in which transmission signals with a small frequency change rate (indicated by a solid line) are transmitted. In the transmission interval T1 in which the frequency change rate is large, the transmission signal frequency rises and falls linearly with a central frequency f0 and frequency modulation width $\Delta F1$, according to a sawtooth wave of frequency fm1. And, in the transmission interval T2 in which the frequency change rate is small, the transmission signal frequency rises and falls linearly with a central frequency f0 and frequency modulation width $\Delta F2$, according to a sawtooth wave of frequency fm2. Here, fm1>fm2, or $\Delta F1 > \Delta F2$.

And, the radar transceiver 30 generates beat signals having frequencies corresponding to the frequency differences between the transmission signals and reception signals (indicated by dashed lines) in each up interval and down interval of the respective transmission intervals Here, if for convenience of explanation it is assumed that the frequency shifts of reception signals are the same in the transmission intervals T1 and T2, then the beat signal frequencies, as indicated in the bottom of FIG. 6, are beat frequency $\alpha 1$ in the up interval and beat frequency $\beta 1$ in the down interval of transmission interval T1, and beat frequency $\alpha 2$ in the up interval and beat frequency $\beta 2$ in the down interval of transmission interval T2.

When beat signals are generated having beat frequencies as described above, the distance/velocity detection unit 14a of the signal processing device 14 performs frequency analysis of the beat signals, taking the transmission intervals T1, T2 as one detection cycle, and based on the detected beat frequencies, detects the relative distance and relative velocity of the target object. In this aspect, the following five types of detection processing are executed in one detection cycle, to detect the relative distance and relative velocity.

In the first detection processing, the distance/velocity detection unit 14a uses the up interval beat frequency $\alpha 1$ and down interval beat frequency $\beta 1$ in the transmission interval T1 in computation processing to solve the following equations and determine the relative distance R1 and relative velocity V1. Below, C represents the speed of light.

$$R1 = C \cdot (\alpha 1 + \beta 1)/(8 \cdot \Delta F1 \cdot fm1) \tag{5}$$

$$V1 = C \cdot (\beta 1 - \alpha 1)/(4 \cdot f0) \tag{6}$$

In the second detection processing, the distance/velocity detection unit 14a uses the up interval beat frequency $\alpha 2$ and down interval beat frequency $\beta 2$ in the transmission interval T2 in computation processing to solve the following equations and determine the relative distance R2 and relative velocity V2.

$$R2 = C \cdot (\alpha 2 + \beta 2)/(8 \cdot \Delta F2 \cdot fm2) \tag{7}$$

$$V2 = C \cdot (\beta 2 - \alpha 2)/(4 \# f0) \tag{8}$$

In the third detection processing, the distance/velocity detection unit 14a uses the up interval beat frequency α1 in the transmission interval T1 and the down interval beat frequency β2 in the transmission interval T2 in computation processing to solve the following equations and determine the relative distance R3 and relative velocity V3. Below, C represents the speed of light.

$$R3 = C \cdot (\alpha1 + \beta2)/(8 \cdot \Delta F1 \cdot fm1) \quad (9)$$

$$V3 = C \cdot (\beta2 - \alpha1)/(4 \cdot f0) \quad (10)$$

In the fourth detection processing, the distance/velocity detection unit 14a uses the up interval beat frequency α1 in the transmission interval T1 and the up interval beat frequency α2 in the transmission interval T2 in computation processing to solve the following equations (the above-described equations (1), (2)) and determine the relative distance R4 and relative velocity V4.

$$R4 = (2 \cdot \alpha2 - \alpha1)/(2 \cdot 4 \cdot \Delta F2 \cdot fm2/C) \quad (1)$$

$$V4 = \{\Delta F1 \cdot fm1 \cdot \alpha2/(\Delta F2 \cdot fm2 - \Delta F1 \cdot fm1) - \alpha1\}/(4 \cdot f0/C) \quad (2)$$

In the fifth detection processing, the distance/velocity detection unit 14a uses the down interval beat frequency β1 in the transmission interval T1 and the down interval beat frequency β2 in the transmission interval T2 in computation processing to solve the following equations (the above-described equations (3), (4)) and determine the relative distance R5 and relative velocity V5.

$$R5 = (2\#\beta2 - \beta1)/(2 \cdot 4 \cdot \Delta F2 \cdot fm2/C) \quad (3)$$

$$V5 = \{\Delta F1 \cdot fm1 \cdot \beta2/(\Delta F2 \cdot fm2 - \Delta F1 \cdot fm1) - \beta1\}/(4 \cdot f0/C) \quad (4)$$

FIG. 7A to FIG. 7E show the range of relative distances and relative velocities which can be detected by the above five types of detection processing. The horizontal axes indicate relative distances, and the vertical axes indicate relative velocities. Here, the frequency modulation widths ΔF1, ΔF2 of transmission signals in the transmission intervals T1, T2 are both 400 MHz; taking as an example a case in which the sawtooth wave frequency fm1 in the transmission interval T1 is 400 Hz and the sawtooth wave frequency fm2 in the transmission interval T2 is 200 Hz, FIG. 7A shows the detectable range by the first detection processing, FIG. 7B shows the range for the second detection processing, FIG. 7C shows the range for the third detection processing, and FIG. 7D show the range for the fourth and fifth detection processing, while FIG. 7E shows the detectable range when all these ranges are superposed. As shown in FIG. 7E, a plurality of detectable ranges are superposed. Hence in the superposed range, the same pairs can be detected by a plurality of types of detection processing.

In this aspect, the distance/velocity detection unit 14a determines the relative distance and relative velocity by combining five beat signals in one detection cycle, and the distance/velocity confirmation unit 14b sets evaluation values for each pair of relative distance and relative velocity detected by each of the different types of detection processing, and adds the evaluation values to compute a total sum. And, for pairs detected by a plurality of different detection types, a plurality of evaluation values are added.

In this way, when five types of detection processing are performed in one detection cycle, by superposing the five ranges which can be detected, not only can the overall range which can be detected be expanded, but pairs belonging to a plurality of ranges which can be detected are detected by the respective detection processing types. That is, in a single detection cycle, results equivalent to those obtained by execution of a plurality of detection cycles are obtained.

Then, the distance/velocity confirmation unit 14b outputs pairs, the evaluation values for which have reached a criterion value, to the vehicle control device 100. In a method of the prior art, in which pairs are detected by the third or fourth type of detection processing in each detection cycle, and when the number of detections has reached a stipulated number (for example, four), the pair is judged to have continuity, processing time for at least four detection cycles is necessary; but in the above-described method, by computing the total sum taking as evaluation values the number of detections, it is possible to judge as having continuity pairs for which a criterion value (for example four) has been reached in a fewer number of detection cycles. Hence the detection results can be output at an earlier time to a vehicle control device, so that a delay in vehicle control can be prevented.

This aspect has the advantageous result that, by superposing the ranges which can be detected by the first through third types of detection processing and the range which can be detected by the fifth detection processing type, even when the relative distance and relative velocity cannot be detected by the first through third detection processing types, detection by the fifth detection processing type is possible. This is because beat signals in up intervals with comparatively low frequencies are easily buried in DC components and in beat signals based on signals reflected from stationary objects, so that detection may not be possible, and thus there are cases in which the relative distance and relative velocity cannot be detected by the first through third detection processing types using beat signals in up intervals. On the other hand, beat signals in down intervals with a comparatively high frequency are easily detected, so that relative distances and relative velocities which cannot be detected by the first through third processing types can be detected by the fifth detection processing type, which uses the beat frequencies β1, β2 of the down intervals in the transmission intervals T1 and T2.

Figures 8A, 8B:
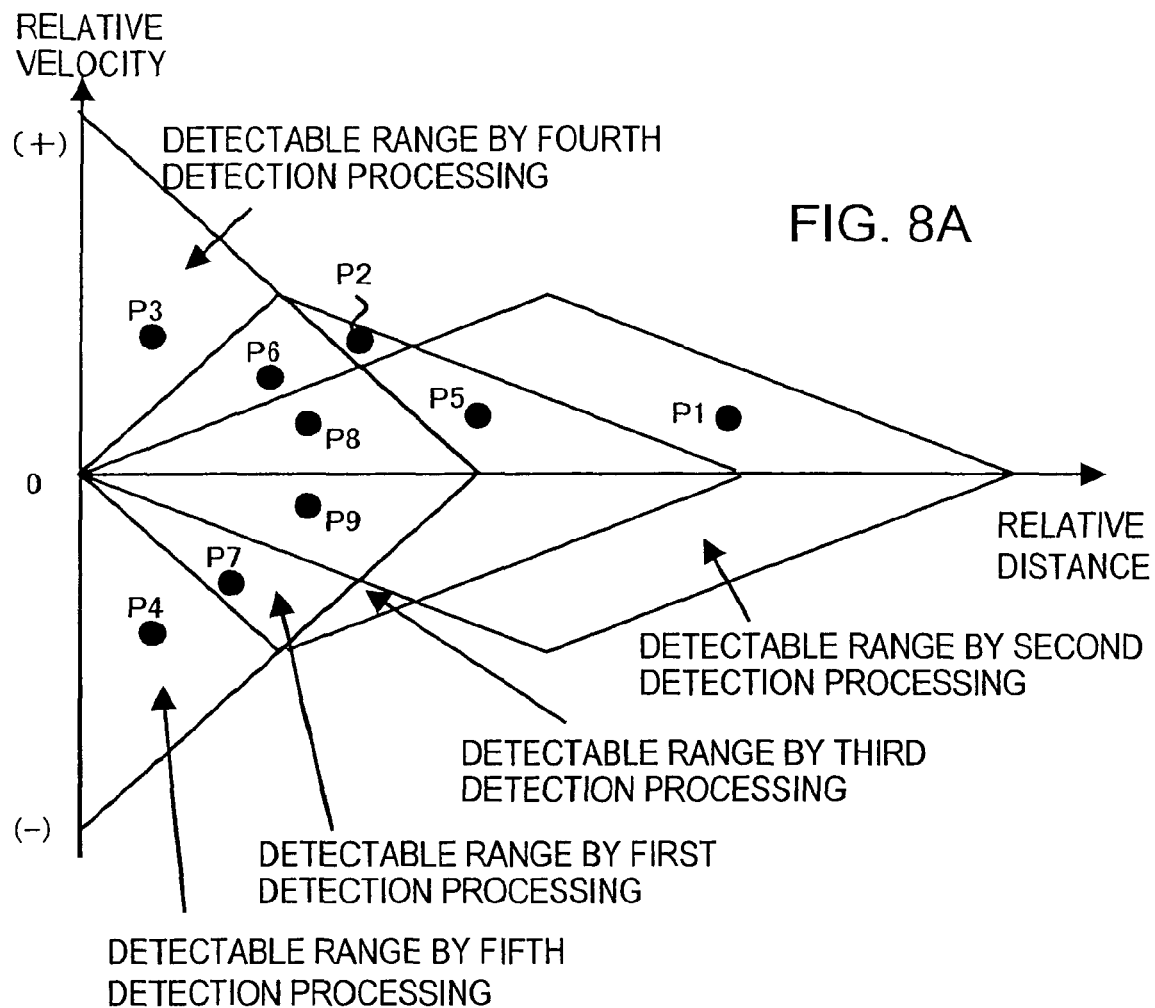
FIG. 8A and FIG. 8B explain the method of addition of evaluation values in an aspect.

A specific example is shown in FIG. 8A and FIG. 8B. In FIG. 8A, pairs of relative velocities and relative distances, detected in one detection cycle, are shown in association with detectable ranges. The figure indicates that pair P1 was detected by the second detection processing type, pair P2 was detected by the third detection processing type, pair P3 was detected by the fourth detection processing type, pair P4 was detected by the fifth detection processing type, pair P5 was detected by the second and third detection processing types, pair P6 was detected by the first, third, and fourth detection processing types, pair P7 was detected by the first, third, and fifth detection processing types, pair P8 was detected by the first, second, third, and fourth detection processing types, and pair P9 was detected by the first, second, third, and fifth detection processing types.

Evaluation values in one detection cycle for the above first through ninth pairs P1 through P9 are added as the number of detection processing types used in detection, resulting in FIG. 8B. The evaluation values for pairs P8 and P9 have reached the criterion value of "4" or greater, so that these pairs are judged to have continuity in one detection cycle, and the results are output as data for vehicle control to the vehicle control device 100. The evaluation values for pairs P6 and P7 are "3", so that if the pairs are detected once in one more detection cycle, the criterion value of "4" or greater will result, and these pairs will be judged to have continuity. The evaluation values for pair P5 is "2", so that if after one more detection cycle the pair is detected by two detection processing types, or if the pair is detected in two more detection cycles, the criterion value of "4" or greater will result, and the pair will be judged to have continuity. In this way, continuity can be judged early, without executing four detection cycles.

FIG. 9 is a flowchart showing the operating procedure of the signal processing device of this aspect. This operating procedure is executed each time the beat signals for one detection cycle are input from the radar transceiver 30. That is, the signal processing device 14, upon performing FFT processing of a beat signal and detecting a beat frequency (S2), performs distance/velocity detection (S4). Then, by scanning transmission signals or reception signals, the azimuth angle of the target object is detected (S6). And, a judgment is made as to whether output is possible, according to whether the detection result is relevant to the quantity to be controlled (S8); if it is judged that output is possible, the detection results are output to the vehicle control device 100 (S10).

Figure 10:
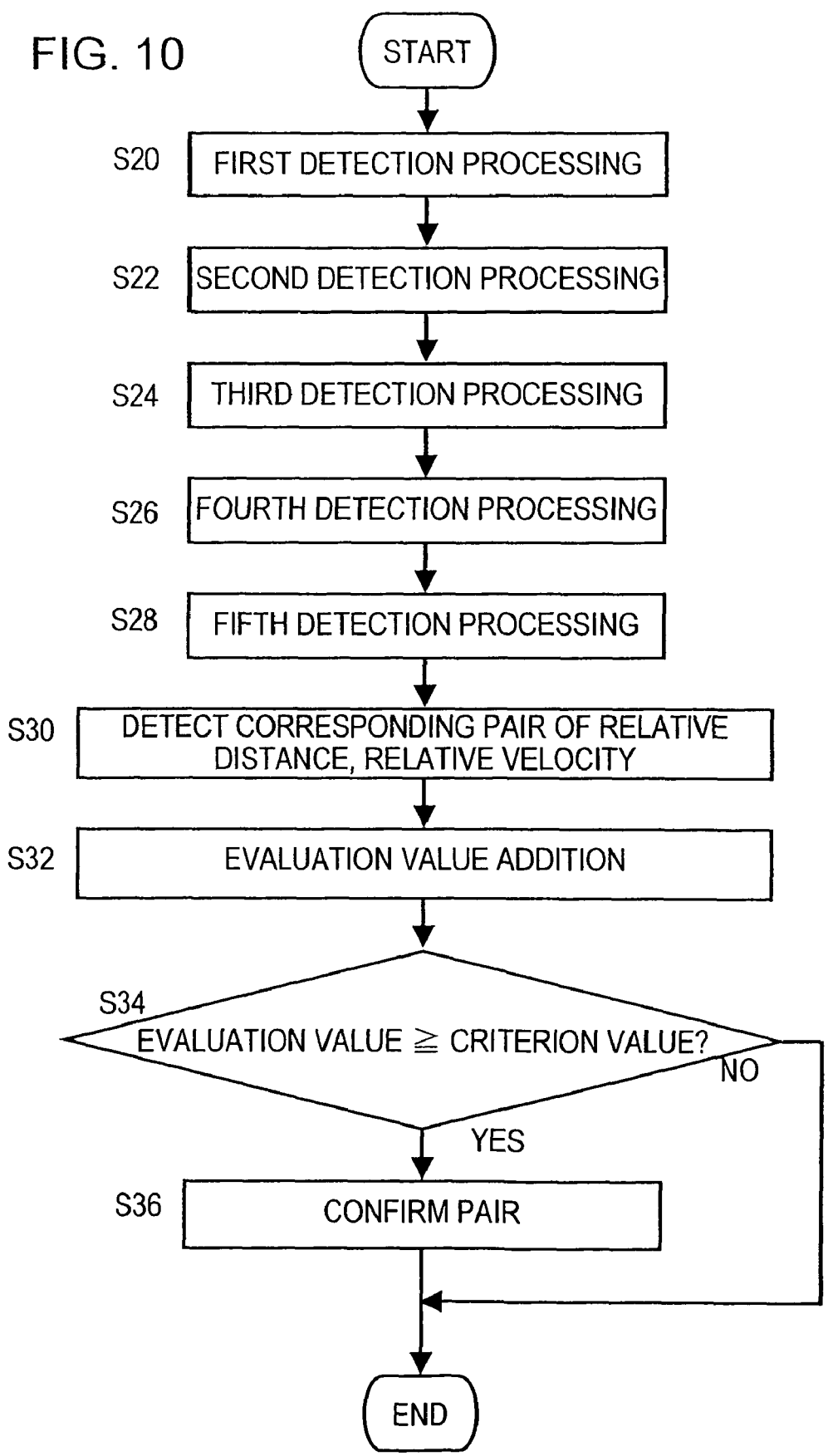
FIG. 10 is a flowchart showing the detailed procedure of relative distance and relative velocity detection processing.

FIG. 10 is a flowchart showing the detailed procedure of relative distance and relative velocity detection processing in the above procedure S4.

The distance/velocity detection unit 14a performs five types of detection processing (S20 through S28) using the beat frequencies, and detects corresponding pairs of relative velocities and relative distances from the various detection processing results (S30). Then, the distance/velocity confirmation unit 14b adds the evaluation values for the detected pairs (S32), and those pairs for which evaluation values have reached a criterion value (for example, four) (YES in S34) are confirmed as detection results (S36).

In this aspect, evaluation values with different weightings can be added to pairs of relative velocities and relative distances according to the type of detection processing used in detection. Here, the following two weighting methods can be used.

As the first method, evaluation values can be added according to the resolution of the relative velocity and relative distance. That is, the larger the frequency change rate of transmission signals, the greater is the amount of change in the beat frequency for a constant amount of change in the relative velocity or relative distance. In other words, the resolution is higher. Hence the first detection processing type, which uses beat signals obtained in transmission interval T1 with a larger frequency change rate, detects relative velocity and relative distance with higher precision than does the second detection processing type, which uses beat signals obtained in transmission interval T2 with a smaller frequency change rate. Hence a higher evaluation value is added for a pair detected using the first detection processing type than for a pair detected using the second detection processing type. By this means, pairs with higher precision reach the criterion value more quickly than pairs with lower precision. Hence rather than judging continuity of detection results simply based on the number of detections, detection results with higher accuracy can be used more quickly in vehicle control. Conversely, pairs with low precision can have a relatively low precision compensated by means of a number of detection cycles.

In this case, the evaluation values added for pairs detected by the third detection processing type, which uses a beat signal obtained in the transmission interval T1 with a large frequency change rate and a beat signal obtained in the transmission interval T2 with a small frequency change rate, are smaller than the evaluation values for pairs obtained by the first detection processing type, and larger than the evaluation values for pairs obtained by the second detection processing type.

FIG. 11A to FIG. 11C show an example of evaluation values, based on the first method. FIG. 11A shows pairs of relative velocity and relative distance detected in one detection cycle, in association with the detectable ranges by the first through third detection processing types. Here, pair P1 is detected by the second detection processing type, pair P2 is detected by the third detection processing type, pair P3 is detected by the first and third detection processing types, pair P4 is detected by the second and third detection processing types, and pair P5 is detected by the first, second, and third detection processing types.

FIG. 11B shows evaluation values for pairs detected by the first through third detection processing types. The totals of the evaluation values for the above pairs P1 through P6 in the first detection cycle are as in FIG. 11C. That is, an evaluation value "1" is added for pair P1, corresponding to the second detection processing type; an evaluation value "2" is added for pair P2, corresponding to the third detection processing type; an evaluation value "3", corresponding to the first detection processing type, and an evaluation value "1" corresponding to the third detection processing type, for a total of "4", is added for pair P3; an evaluation value "2" corresponding to the second detection processing type, and an evaluation value "1" corresponding to the third detection processing type, for a total of "3", is added for pair P4; and an evaluation value "3" corresponding to the first detection processing type, an evaluation value "1" corresponding to the second detection processing type, and an evaluation value "2" corresponding to the third detection processing type, for a total of "6", is added for pair P5.

Hence in this case, according to the procedure shown in FIG. 10, the pairs P3 and P5 have evaluation values equal to or greater than the criterion value "4", and so are judged to have continuity in one detection cycle, and are output to the vehicle control device 100 as vehicle controlled quantities. The evaluation value for the pair P4 is "3", so that if the pair is detected once in one more detection cycle, the pair will be judged to have continuity. The evaluation value for the pair P2 is "2", so that if the pair is detected by two detection processing types in one more detection cycle, or is detected in two more detection cycles, the pair will be judged to have continuity. In this way, continuity judgments can be made early, without executing four detection cycles.

As a second method, evaluation values can be added according to the importance with regard to vehicle control. For example, when placing highest priority on safety, target objects at close distances are important for control to avoid and respond to collisions. In particular, a target object which is rapidly approaching (has a high negative relative velocity) has the highest importance. From this point of view, larger evaluation values are added for pairs detected by the fourth and fifth detection processing types, by which detection at shorter distance is possible, than for pairs detected by other detection processing types, such as for example the second detection processing type, by which the detection range at close distances is limited.

Further, among the fourth and fifth detection processing types by which detection at close distances is possible, a larger evaluation value is added for pairs detected by the fifth detection processing type, by which target objects having a negative relative velocity (that is, which are approaching) can be detected, compared with the evaluation value for pairs detected by the fourth detection processing type, by which target objects having a positive relative velocity (that is, which are receding) can be detected. By this means, detection results with high importance according to the purpose of control can be judged to have continuity earlier, and can be output.

Figures 12A, 12B, 12C:
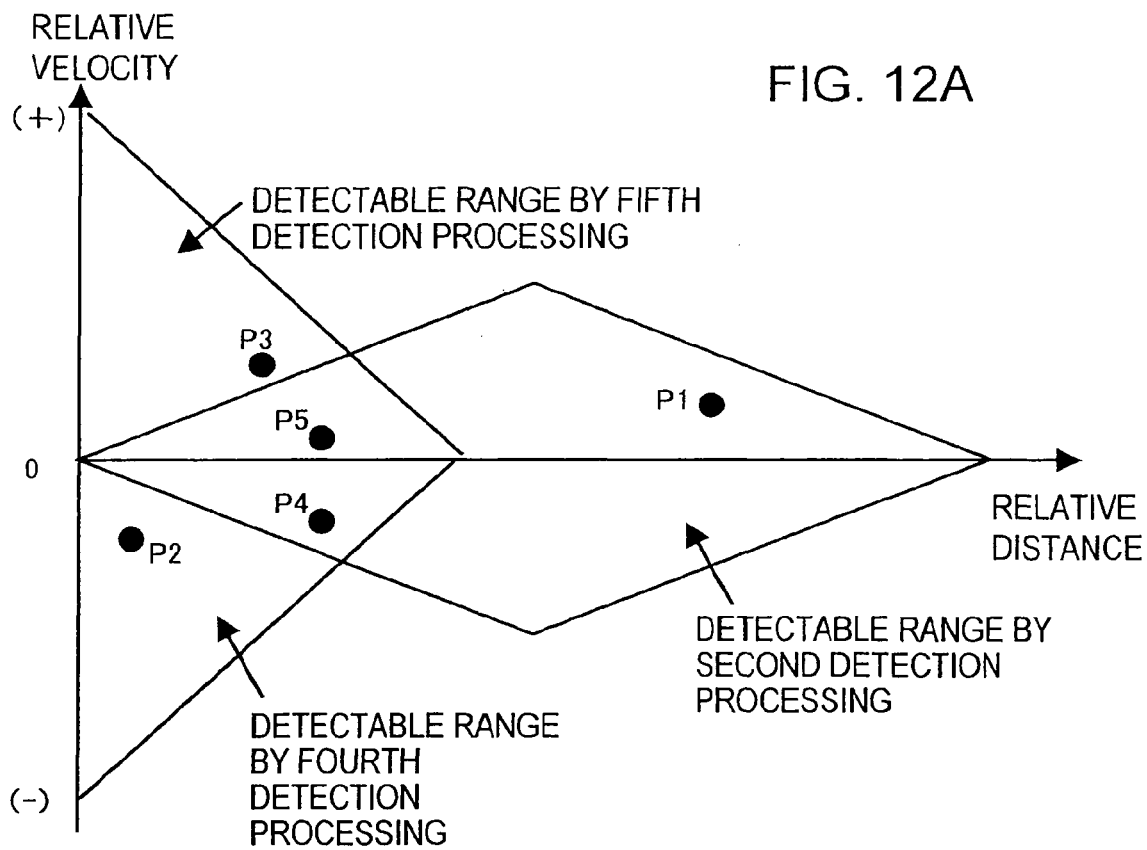
FIG. 12A to FIG. 12C show an example of evaluation values based on a second method.

FIG. 12A to FIG. 12C show an example of evaluation values based on this second method. In FIG. 12A, pairs of relative velocity and relative distance detected in one detection cycle are shown, associated with the ranges which can be detected by the second detection processing type and by the fourth and fifth detection processing types. Here, pair P1 is detected by the second detection processing type, pair P2 is detected by the fourth detection processing type, pair P3 is detected by the fifth detection processing type, pair P4 is detected by the second and fourth detection processing types, and pair P5 is detected by the second and fifth detection processing types.

FIG. 12B shows evaluation values for pairs detected by the second, fourth, and fifth detection processing types. The evaluation value totals for the above pairs P1 through P5 in one detection cycle are as shown in FIG. 12C. That is, an evaluation value "1", corresponding to the second detection processing type, is added for pair P1; an evaluation value "4", corresponding to the fourth detection processing type, is added for pair P2; an evaluation value "3", corresponding to the fifth detection processing type, is added for pair P3; an evaluation value "1" corresponding to the second detection processing type, and an evaluation value "4" corresponding to the fourth detection processing type, for a total of "5", is added for pair P4; and an evaluation value "1", corresponding to the second detection processing type, and an evaluation value "3" corresponding to the fifth detection processing type, for a total of "4", is added for pair P5.

Hence in this case, by means of the procedure shown in FIG. 10, the pairs P2, P4, P5 have evaluation values equal to or greater than the criterion value "4", and so are judged to have continuity in one detection cycle, and are output to the vehicle control device 100 as vehicle controlled quantities. The pair P3 has an evaluation value of "3", so that if the pair is detected once in one more detection cycle, it will be judged to have continuity. In this way, continuity judgments can be made early, without executing four detection cycles.

FIG. 13A to FIG. 13C show an example of evaluation values in a case which combines the first and second methods. FIG. 13A shows pairs of relative velocity and relative distance shown in FIG. 8A, associated with the ranges which can be detected.

Here, the evaluation values for the above pairs P1 through P9 are added as shown in FIG. 13B. That is, based on the resolution of the relative distance and relative velocity and on the importance for control, evaluation values are assigned, in order of magnitude, to the first detection processing type, fourth detection processing type, fifth detection processing type, third detection processing type, and second detection processing type.

Then, the evaluation value totals for the above pairs P1 through P5 in one detection cycle are as shown in FIG. 13C. That is, an evaluation value "1", corresponding to the second detection processing type, is added for pair P1; an evaluation value "2", corresponding to the third detection processing type, is added for pair P2; an evaluation value "3", corresponding to the fourth detection processing type, is added for pair P3; an evaluation value "4" corresponding to the fifth detection processing type is added for pair P4; and an evaluation value "1", corresponding to the second detection processing type, and an evaluation value "2" corresponding to the third detection processing type, for a total of "3", is added for pair P5. Further, for pair P6, an evaluation value of "5", corresponding to the first detection processing type, an evaluation value of "2", corresponding to the third detection processing type, and an evaluation value of "3", corresponding to the fourth detection processing type, are added, for a total of "10"; and for pair P7, an evaluation value of "5", corresponding to the first detection processing type, an evaluation value of "2", corresponding to the third detection processing type, and an evaluation value of "4", corresponding to the fifth detection processing type, are added, for a total of "11". Further, for pair P8, an evaluation value of "5", corresponding to the first detection processing type, an evaluation value of "1", corresponding to the second detection processing type, an evaluation value of "2", corresponding to the third detection processing type, and an evaluation value of "4", corresponding to the fourth detection processing type, are added, for a total of "12"; and for pair P9, an evaluation value of "5", corresponding to the first detection processing type, an evaluation value of "1", corresponding to the second detection processing type, an evaluation value of "2", corresponding to the third detection processing type, and an evaluation value of "5", corresponding to the fifth detection processing type, are added, for a total of "13".

In this way, the evaluation values for pair P4 and pairs P6 through P9 are equal to or greater than the criterion value "4", so that they are judged to have continuity in one detection cycle, and the pairs are output to the vehicle control device 100 as vehicle controlled quantities. Other pairs can also be judged to have continuity at an earlier time.

Further, in a case in which numerous target objects exist, when due to constraints on the amount of processing by the vehicle control device 100 the detection results to be output must be limited, pairs can be output in the order of the magnitude of the evaluation value.

Figure 1B:
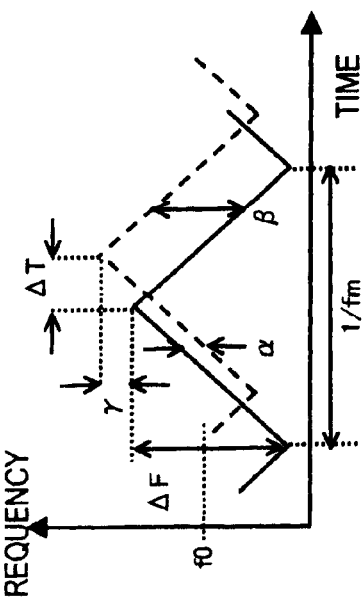
Figure 1D:
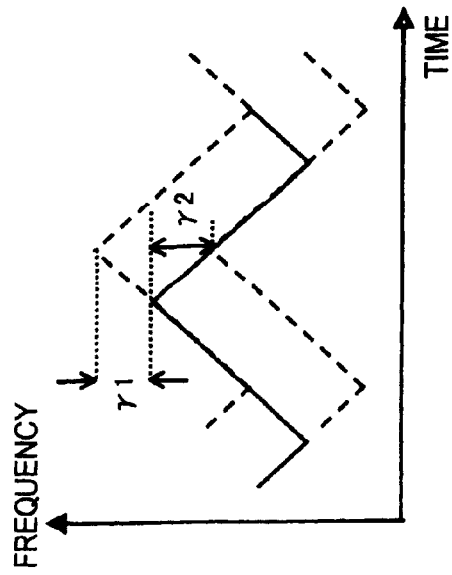
Figure 3A:
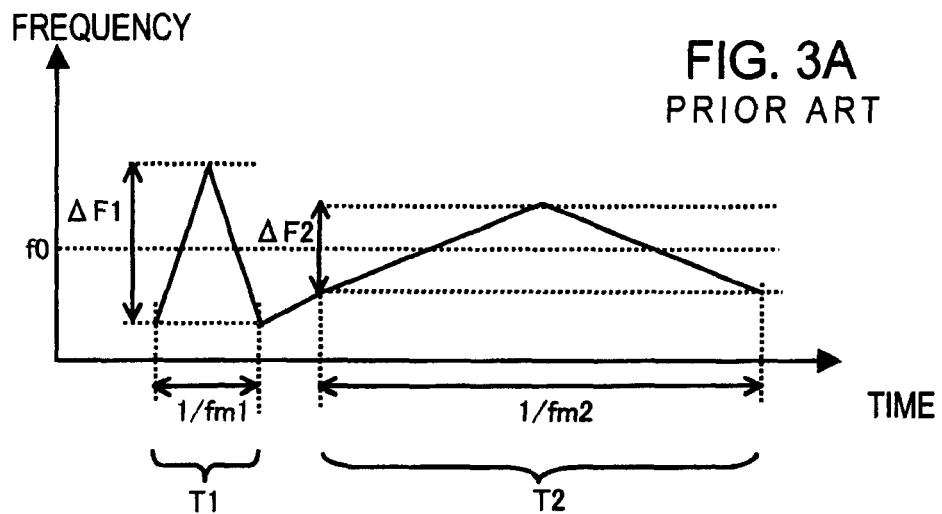
FIG. 3A and FIG. 3B show two types of frequency modulation performed on transmission signals.
Figure 3B:
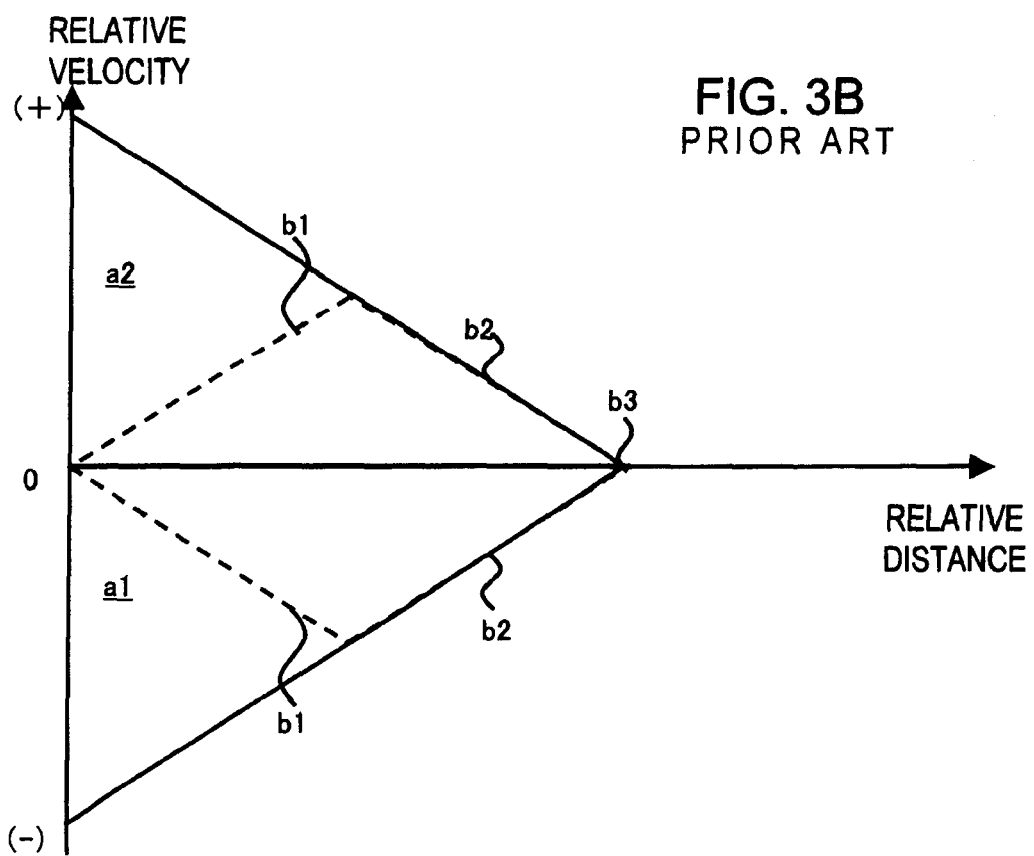

Further, in this aspect false relative velocities, detected due to beat frequency folding due to a so-called crossover phenomenon, can be eliminated. A crossover phenomenon occurs when the frequency difference between transmission and reception signals in an up interval or a down interval becomes small due to an increase in the positive or negative relative velocity, so that finally the time at which the beat frequency shown in FIG. 1B can no longer be detected, and there is reversal of the magnitudes of the frequencies of transmission and reception signals in the up interval or the down interval. Hence when crossover occurs, the sign of the beat frequency is inverted.

On the other hand, in FFT processing by the signal processing device 14, a positive frequency is detected, so that a beat frequency inverted to a negative sign is detected as a beat frequency with a positive sign and the same absolute value. That is, a false beat frequency, not reflecting the true relative velocity of the target object, is detected. And from this false beat frequency, a false relative velocity is detected.

Figure 14A:
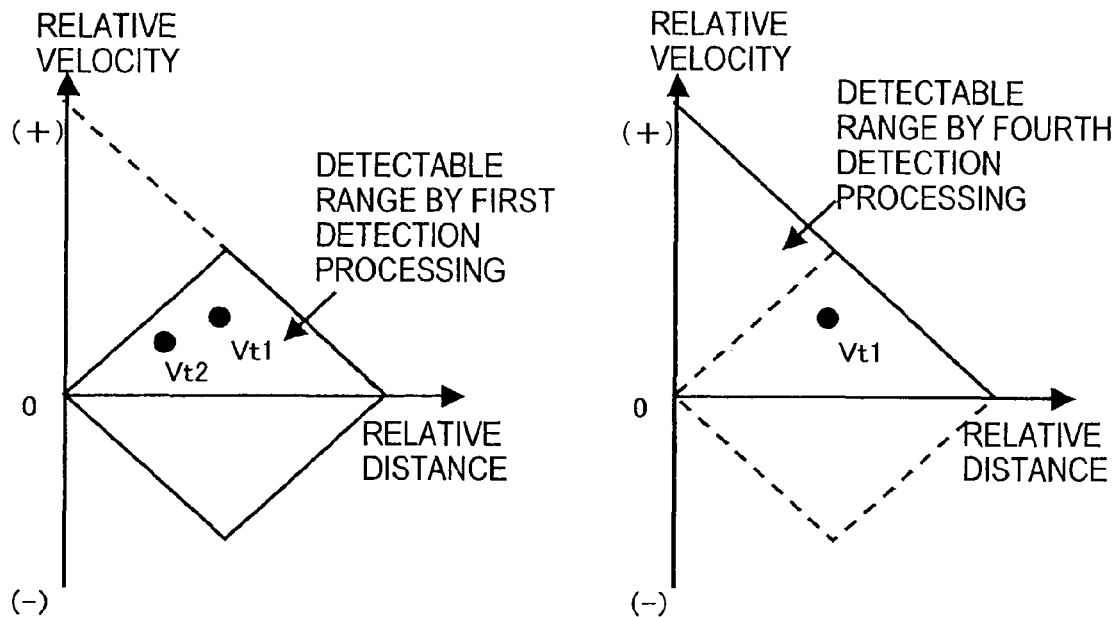
FIG. 14A and FIG. 14B explain processing in a case in which frequency folding occurs.
Figure 14B:
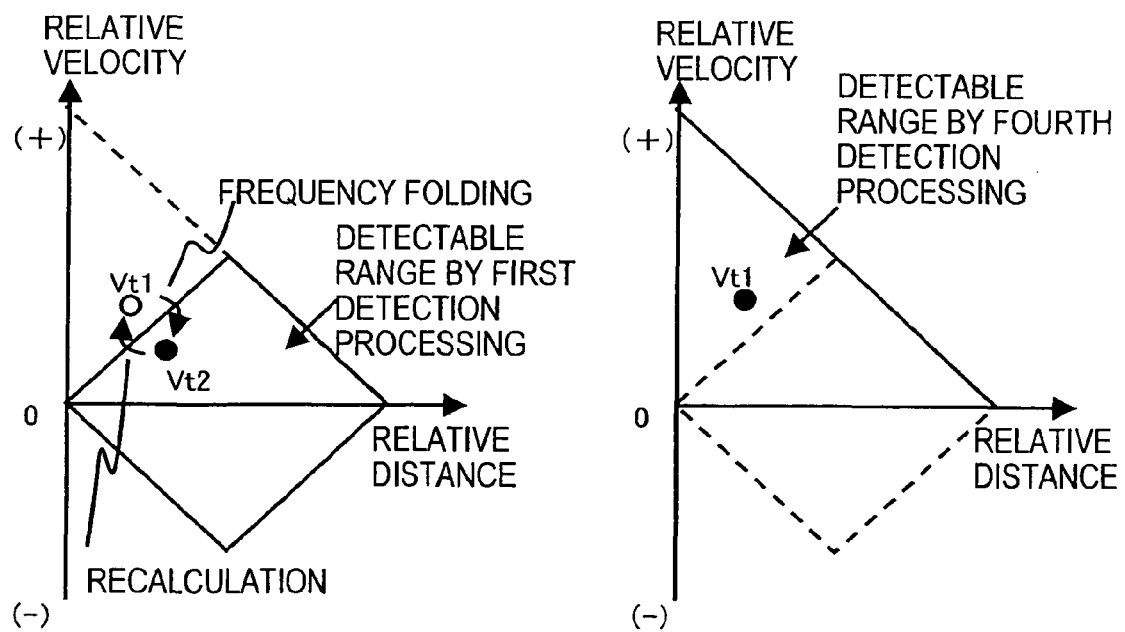

Here, when frequency folding occurs, the relation between the true relative velocity which should be detected from the true beat frequency, and the false relative velocity detected from the false beat frequency due to folding, is associated with the detectable ranges for the different detection processing types as shown in FIG. 14A and FIG. 14B.

FIG. 14A shows a case in which, when the true relative velocity Vt1 and a false relative velocity Vt2 are detected by the first detection processing type, the true relative velocity Vt1 is detected by the fourth detection processing type, including the detectable range by the first detection processing type. For purposes of clarity of explanation, the third detection processing type is not considered. Here, when only the first detection processing type is executed, there exists no criterion for judging whether the relative velocity Vt2 is false or not, so no judgment is possible. However, in this case the relative velocity Vt1 is detected, but the relative velocity Vt2 is not detected, by the fourth detection processing type. If the relative velocity Vt2 were the true relative velocity, then because it exists within the detectable range by the fourth detection processing type, it would have been detected.

Hence using this as a judgment criterion in this aspect, the relative velocity Vt2 can be judged to be false. Specifically, taking the evaluation values shown in FIG. 13A to FIG. 13C as an example, for the relative velocity V1 the evaluation value "5" for the first detection processing type and the evaluation value "4" for the fourth detection processing type are added to obtain the total "9", but for the relative velocity V2, only the evaluation value "5" for the first detection processing type is added. Hence by for example eliminating relative velocities with an evaluation value of less than 6, the false relative velocity can be eliminated from controlled quantities. Hence erroneous vehicle control based on a false relative velocity can be prevented.

As another example, a case is shown in FIG. 14B in which a false relative velocity Vt2 is detected using the first detection processing type, and the true relative velocity Vt1, outside the detectable range by the first detection processing type, is detected by the fourth detection processing type. In this case, when the relative velocity Vt2 is detected the sign of the beat frequency is inverted and the relative velocity is recalculated, and it is possible to determine whether the relative velocity Vt1 is obtained. If the relative velocity Vt1 is obtained, then not only can the relative velocity Vt2 be judged to be a false relative velocity, but the evaluation value for the first detection processing type can be added for the relative velocity Vt1 recalculated by the first detection processing type, to increase the evaluation value for the relative velocity Vt1. As a result, the relative velocity Vt1 can be output at an earlier time. Here, in the first detection processing, crossover occurs when the absolute value of the relative velocity is large at a small relative distance. Moreover, this combination of relative distance and relative velocity is important with respect to control of the vehicle. Hence by means of the above method, not only can the relative velocity Vt2 be judged to be a false relative velocity due to the first detection processing type, but the true relative velocity Vt1 can be used at an earlier time for vehicle control. Hence safety in vehicle control is improved.

Figure 15:
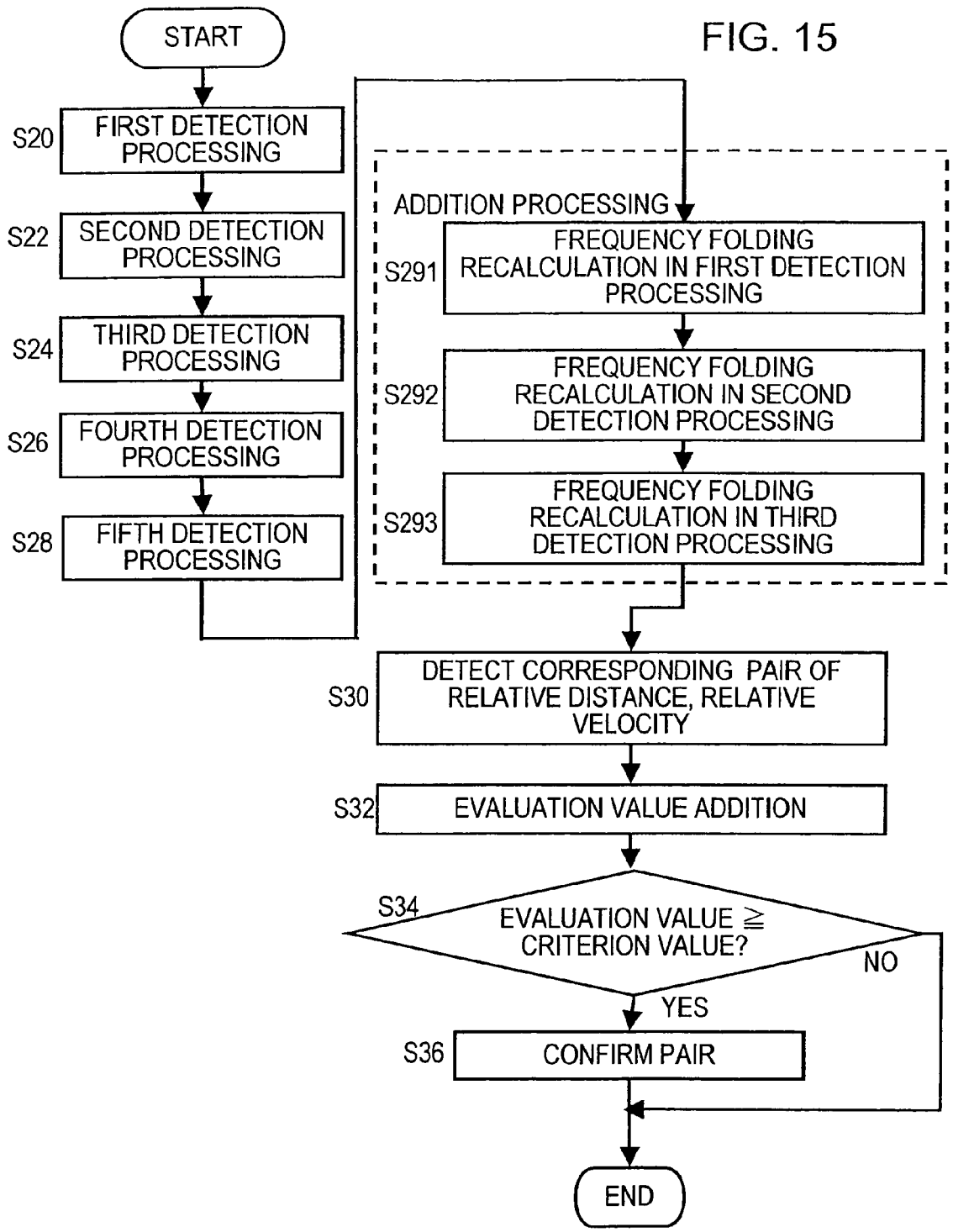
FIG. 15 is a flowchart showing the operation procedure of the distance/velocity detection unit 14a, comprising relative velocity recalculation.

FIG. 15 is a flowchart showing the operation procedure of the distance/velocity detection unit 14a, comprising the relative velocity recalculation. This flowchart shows the procedure shown in FIG. 10, with procedures S291 through S293 to perform recalculation of the relative velocity, taking into account frequency folding in the first through third detection processing types as described above. In this case, evaluation values for each of the detection processing types are added for the recalculated relative velocity, so that if the true relative velocity exists in the detectable range by the fourth or the fifth detection processing type, and is outside the detectable ranges by the first through third detection processing types, then the evaluation value for the true relative velocity can be added. Hence the relative velocity can be output earlier.

In the above explanation, transmission intervals T1, T2 with different transmission signal frequency change rates were taken to constitute one detection cycle; but this aspect can also be applied in cases when the transmission intervals T1, T2 are executed a plurality of times in one detection cycle. Moreover, the first through fifth detection processing types to detect relative velocities and relative distances may be executed a plurality of times in one detection cycle, to improve the accuracy of the detection results. As explained above, by means of this aspect even when a plurality of different frequency change rates are used, relative velocities and relative distances are determined using combinations of a plurality of beat signals in one detection cycle, so that more data can be obtained within one detection cycle, and the same advantageous results as when executing a plurality of detection cycles are obtained. Hence delay in the output of detection results from the radar device to a vehicle control device can be prevented.

What is claimed is:

1. A signal processing device, of a radar transceiver which receives reflected signals of transmitted signals subjected to frequency modulation such that the frequency rises and falls and which generates beat signals having frequencies corresponding to the frequency differences between the transmission signals and reception signals, comprising:
a distance/velocity detection unit, in each detection cycle comprising a plurality of transmission intervals with different frequency change rates of the transmission signals, which detects a relative distance or relative velocity of a target object based on beat signals generated in any of the transmission intervals, and which detects the relative distance or relative velocity of the target object based on a combination of the beat signals generated in the different transmission intervals; and
a distance/velocity confirmation unit, which detects detectable ranges of the relative distance or relative velocity for each of a plurality of detection processing types, which sets an evaluation value for a plurality of the detectable ranges, which adds the evaluation value of superposed detectable ranges to compute a total sum, and which confirms the relative distance or relative velocity based on the evaluation value which have reached a criterion value.

2. The signal processing device according to claim 1, wherein the distance/velocity confirmation unit sets a higher evaluation value for the relative distance or relative velocity detected based on the beat signals generated in a transmission interval with a first frequency change rate, than an evaluation value for the relative distance or relative velocity detected based on the beat signals generated in a transmission interval with a second frequency change rate which is smaller than the first frequency change rate.

3. A radar device, comprising the radar transceiver and the signal processing device according to claim 2.

4. A vehicle control device, which controls an operation of a vehicle based on a relative distance or relative velocity of the target object confirmed by the radar device according to claim 3.

5. The signal processing device according to claim 1, wherein the distance/velocity confirmation unit sets a higher evaluation value for the relative distance or relative velocity detected based on the beat signals generated when the frequency falls in a first transmission interval and when the frequency falls in a second transmission interval, than an evaluation value for the relative distance or relative velocity detected based on the beat signals generated when the frequency rises in the first transmission interval and when the frequency rises in the second transmission interval.

6. A radar device, comprising the radar transceiver and the signal processing device according to claim 5.

7. A vehicle control device, which controls an operation of a vehicle based on a relative distance or relative velocity of the target object confirmed by the radar device according to claim 6.

8. A radar device, comprising the radar transceiver and the signal processing device according to claim 1.

9. A vehicle control device, which controls an operation of a vehicle based on a relative distance or relative velocity of the target object confirmed by the radar device according to claim 8.

10. A signal processing method for processing beat signals that are generated by a radar transceiver for receiving reflected signals of transmitted signals subjected to frequency modulation such that the frequency rises and falls, and that have frequencies corresponding to the frequency differences between the transmission signals and reception signals, comprising the steps of:
- in each detection cycle comprising a plurality of transmission intervals with different frequency change rates of the transmission signals, detecting a relative distance or relative velocity of a target object based on beat signals generated in any of the transmission intervals, and detecting the relative distance or relative velocity of the target object based on a combination of the beat signals generated in the different transmission intervals;
- detecting detectable ranges of the relative distance or relative velocity for each of a plurality of detection processing types;
- setting an evaluation value for a plurality of the detectable ranges;
- adding the evaluation value of superposed detectable ranges to compute a total sum; and
- confirming the relative distance or relative velocity based on the evaluation value which have reached a criterion value.

11. A signal processing device, of a radar transceiver which receives reflected signals of transmitted signals subjected to frequency modulation such that the frequency rises and falls and which generates beat signals having frequencies corresponding to the frequency differences between the transmission signals and reception signals, comprising:
- a distance/velocity detection unit, in each detection cycle comprising a plurality of transmission intervals with different frequency change rates of the transmission signals, which detects a relative distance or relative velocity of a target object based on beat signals generated in any of the transmission intervals, and which detects the relative distance or relative velocity of the target object based on a combination of the beat signals generated in the different transmission intervals; and
- a distance/velocity confirmation unit, which sets a higher evaluation value for the relative distance or relative velocity detected based on the beat signals generated in a transmission interval with a first frequency change rate, than an evaluation value for the relative distance or relative velocity detected based on the beat signals generated in a transmission interval with a second frequency change rate which is smaller than the first frequency change rate, and which confirms the relative distance or relative velocity based on the evaluation value.

12. A radar device, comprising the radar transceiver and the signal processing device according to claim 11.

13. A vehicle control device, which controls an operation of the vehicle based on a relative distance or relative velocity of the target object confirmed by the radar device according to claim 12.

14. A signal processing device, of a radar transceiver which receives reflected signals of transmitted signals subjected to frequency modulation such that the frequency rises and falls and which generates beat signals having frequencies corresponding to the frequency differences between the transmission signals and reception signals, comprising:
- a distance/velocity detection unit, in each detection cycle comprising a plurality of transmission intervals with different frequency change rates of the transmission signals, which detects a relative distance or relative velocity of a target object based on beat signals generated in any of the transmission intervals, and which detects the relative distance or relative velocity of the target object based on a combination of the beat signals generated in the different transmission intervals; and
- a distance/velocity confirmation unit, which sets a higher evaluation value for the relative distance or relative velocity detected based on the beat signals generated when the frequency falls in a first transmission interval and when the frequency falls in a second transmission interval, than an evaluation value for the relative distance or relative velocity detected based on the beat signals generated when the frequency rises in the first transmission interval and when the frequency rises in the second transmission interval, and which confirms the relative distance or relative velocity based on the evaluation value.

15. A radar device, comprising the radar transceiver and the signal processing device according to claim 14.

16. A vehicle control device, which controls an operation of the vehicle based on a relative distance or relative velocity of the target object confirmed by the radar device according to claim 15.

* * * * *